April 27, 1943.  C. F. SCOTT  2,317,816
REFRIGERATION APPARATUS
Filed Aug. 23, 1941  2 Sheets-Sheet 1

Inventor:
Carl F. Scott,
by Harry E. Dunham
His Attorney.

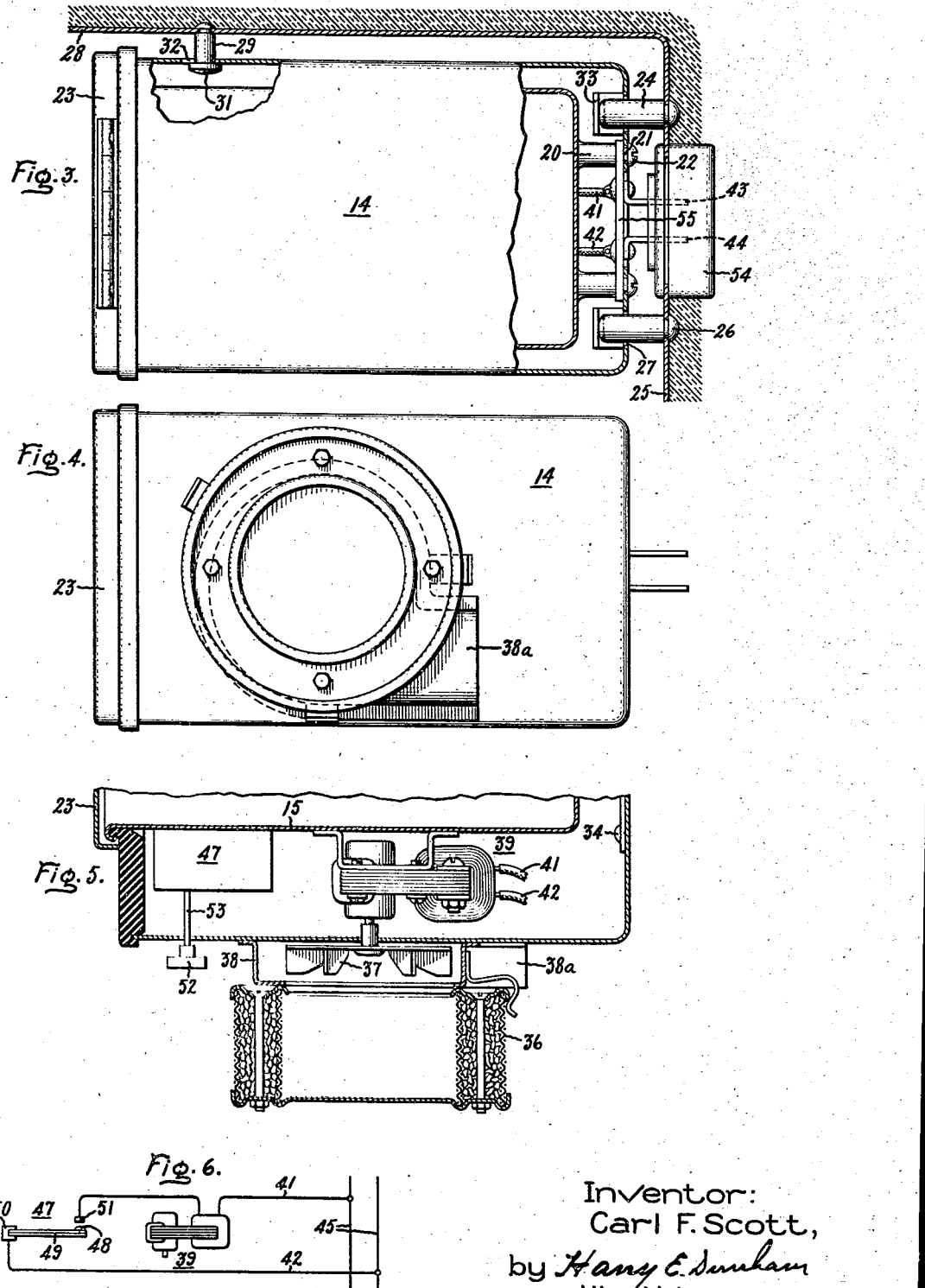

Patented Apr. 27, 1943

2,317,816

UNITED STATES PATENT OFFICE 2,317,816

REFRIGERATION APPARATUS

Carl F. Scott, Milford, Conn., assignor to General Electric Company, a corporation of New York Application August 23, 1941, Serial No. 408,009

4 Claims. (Cl. 62—89)

My invention relates to refrigeration apparatus and more particularly to refrigerator cabinets of the domestic type.

In household refrigerators, receptacles have been provided for the storing of butter and the like at temperatures above that generally prevailing in the refrigerated compartment of the cabinet in order to maintain the butter or the like at a consistency which will enable it easily to be spread. Accordingly, it is an object of my invention to provide new and improved means for maintaining such a receptacle at a suitable temperature above that generally prevailing in the storage compartment.

Electrical devices of various types have been used in refrigerator cabinets. For example, circulating means, such as fans, have been provided for circulating box air as through air purifiers or filters. Accordingly, it is another object of my invention to utilize the heat incidentally developed by the electric current flowing in such devices to maintain the interior of the butter conditioner or the like at a temperature above that generally prevailing in the refrigerated compartment.

Further objects and advantages of my invention will become apparent as the following description proceeds, and the features of novelty which characterize my invention will be pointed out with particularity in claims annexed to and forming a part of this specification.

Figure 1:
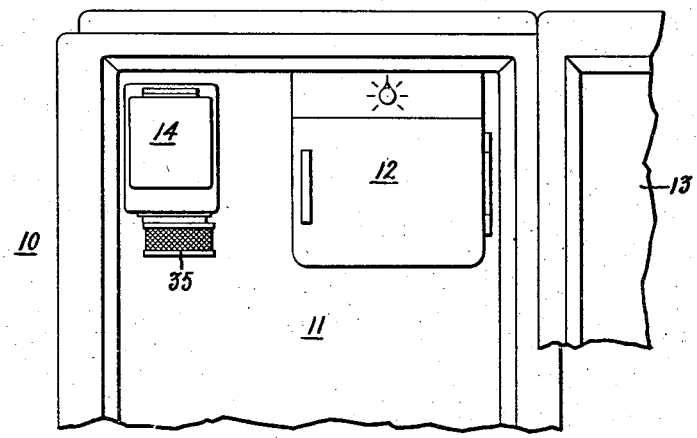
Figure 2:
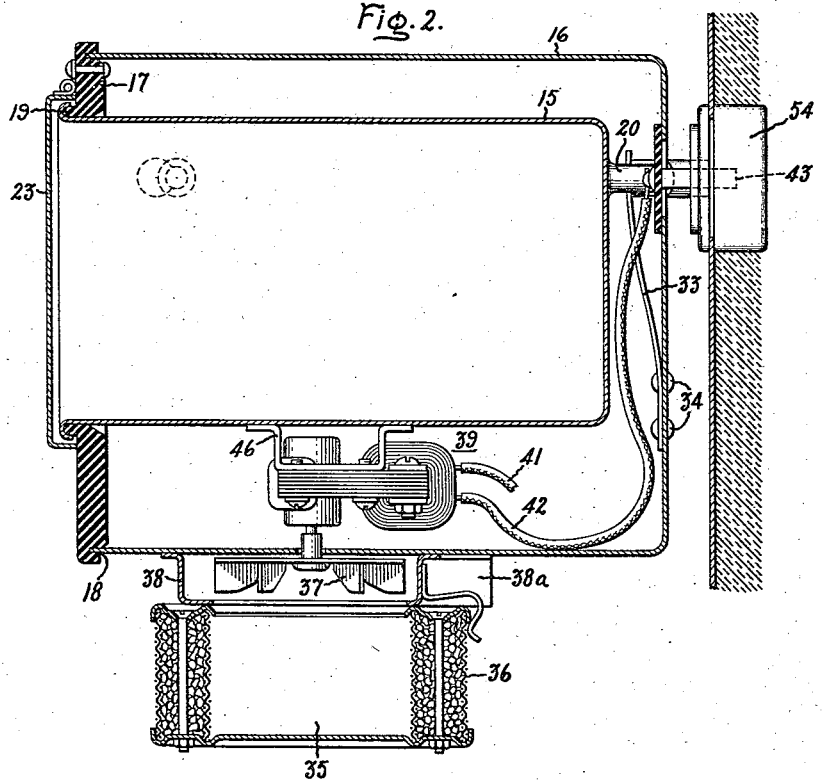

For a better understanding of my invention reference may be had to the accompanying drawing in which Fig. 1 is a front elevational partial view of a refrigerator cabinet embodying my invention; Fig. 2 is an enlarged sectional view of the food storage receptacle shown in Fig. 1; Fig. 3 is a top view, partly broken away, of the receptacle shown in Figs. 1 and 2; Fig. 4 is a bottom view of the storage receptacle shown in Figs. 1 to 3. inclusive; Fig. 5 is a partial sectional view of a receptacle such as that shown in Figs. 1 to 4, inclusive, illustrating a second embodiment of my invention; and Fig. 6 illustrates an electric circuit for the operation of the embodiment of my invention illustrated in Fig. 5.

There is illustrated in the drawings a refrigerator cabinet 10 of the domestic type having suitable heat insulated walls defining a food storage compartment 11 arranged to be cooled by a suitable cooling unit or refrigerant evaporator 12 preferably disposed in the upper portion of the compartment 11. A suitable heat insulated door 13 is provided for closing an access opening to the interior of the cabinet 10. In order to maintain butter and the like at a temperature above that generally prevailing in the storage space 11 but usually lower than the temperature prevailing exteriorly of the cabinet, I have provided a receptacle or compartment 14 having suitable thermally insulated walls. The receptacle is provided with means for conducting heat thereto as hereinafter described in order that heat may be imparted to the interior of the receptacle.

As best seen in Figs. 2 and 3, the walls of the butter compartment or receptacle comprise inner and outer shells or walls 15 and 16, respectively. The inner liner, defining an auxiliary food storage compartment or space, should be formed from a material which is a relatively good conductor of heat, preferably of metal such as aluminum, for example. The outer shell may be made of metal or any other suitable material, as a plastic material, for example. The shells are maintained in spaced-apart relation by means of a frame or spacer member 17 formed from a material having relatively poor heat-conducting characteristics, as a suitable plastic for example. In the form of my invention illustrated in the drawings, the spacer member or element 17 is generally rectangular in cross section and extends entirely around the receptacle in order to close the space between the shells at the front end of the receptacle. By this construction there is provided a layer of substantially dead air between the interior of the receptacle and the food storage compartment which serves to minimize the transfer of heat through the walls of the receptacle. The back face of the spacer is provided with a groove 18 which receives the front edge of the outer shell 16. On the front face of the spacer there is provided a shoulder 19 engaging the turned back edge of the inner shell. The spacer can be made integral with the outer shell if material which is a relatively poor conductor of heat is employed therefor.

In order to maintain the shells and spacer in assembled relationship, there is provided a pair of fastening members in the form of studs 20 which may be secured to the rear wall of the inner liner 15 and which may have suitably threaded bores aligned with openings 21 in the rear wall of the outer liner 16 for the reception of threaded fastening means 22. The studs are preferably formed from a material having relatively poor heat conducting characteristics, as a plastic material, for example.

The foregoing constructional details of the food storage receptacle 14 form no part of my invention but are described and claimed in the copending application, Serial No. 386,947 of La Mar S. Cooper, filed April 4, 1941, and assigned to the same assignee as the present invention.

There is provided a suitably hinged door or closure member 23 for closing the opening in the front wall of the receptacle.

Means has been provided for supporting the compartment or receptacle 14 from the walls of the refrigerator cabinet. As illustrated in the drawings, the receptacle is placed in an upper corner of the refrigerated storage compartment. The receptacle in the illustrated embodiment of my invention is supported at the rear by means of a pair of heat insulating studs 24 suitably secured to the rear wall 25 of the refrigerator as by means of screws 26 extending through suitably threaded bores or openings in the wall 25 into threaded engagement with suitably threaded bores in the studs. The studs pass through suitable openings 27 in the rear wall of the outer shell. The receptacle is supported from a side wall 28 of the refrigerator cabinet by means of a heat insulating stud 29 provided with an enlarged portion or head 31. The stud extends through a suitable opening 32 in the side wall of the outer shell 16. In order to maintain securely the receptacle in position, there is provided a pair of spring members 33 suitably attached to the inner side of the rear wall of the outer shell as by means of rivets 34 for example. The springs are arranged to bear against the ends of the studs 24 thereby urging the receptacle forward with respect to the rear wall of the refrigerator cabinet and therefore urging a portion of the edge of the opening 32 into engagement with the stud 29.

Lateral movement of the receptacle is prevented by the studs 24 and the head 31. The above described means for supporting the receptacle 14 is not my invention but is described and claimed in the copending application of James L. Knight, Serial No. 400,189, filed June 28, 1941, and assigned to the same assignee as my present invention.

It has been proposed to provide refrigerator cabinets with air purifying units or deodorizing units so that air circulated into association therewith will be sufficiently purified to minimize the conduction of odors to food stored in the refrigerator. Thus, I have shown a deodorizing unit 35 mounted on the lower side of the outer casing 16 and containing a suitable air purifying substance or material 36, such as particles of activated carbon, for example, in order to cause the box air to circulate into association with the particles 36 so that odors and other impurities in the circulating air may be removed thereby. I have provided a fan 37 suitably disposed in a casing 38 for the purpose of drawing air as through an inlet 38a and discharging it into the casing 35 from whence it will be discharged through the spaces between the particles 36. As is well understood, the engagement of the air with the surfaces of the particles will cause the odors therein to be adsorbed by the particles, the material also serving to filter out other impurities in the air. The details of the purifying unit form no part of my invention and may be varied to suit any particular situation.

In order to impart rotary motion to the fan device 37, I have provided an electrical device in the form of a motor 39. Any suitable electric circuit may be provided for conducting electric power to the motor. For example, I may provide leads 41 and 42 terminating in suitable plug type terminals 43 and 44, respectively, as shown in Fig. 3, for making an electric circuit to suitable supply lines 45.

I have provided means for applying heat to the interior of the receptacle and for regulating the temperature therein. To this end I mount the motor 39 in thermal relationship with the inner shell 15 of the receptacle as by means of suitable brackets 46 of heat conductive material disposed in intimate thermal relationship with the motor and the inner shell. Thus, it will be apparent that electrical energy dissipated in the motor 39 will be conducted to the receptacle in the form of heat. The motor may be secured in position in any desired fashion as by welding for example.

In the form of my invention shown in Figs. 5 and 6, I have provided a thermostatic device 47 for enabling the supply of heat to the refrigerated compartment to be controlled. The thermostatic device 47 may be of any suitable type. In the diagrammatic arrangement disclosed in Fig. 6, the switch comprises a movable contact 48 carried on the free end of a bimetallic element 49, which is secured at the other end thereof to a fixed support 50. The contact 48 is arranged in operative relationship with an adjustable stationary contact 51, adjustment being had by a suitable adjusting device such as a knob 52 attached to the outer end of an operating rod 53 extending into operative association with the adjustable contact 51. When the temperature of the bimetallic element is above a predetermined temperature, the contacts are retained in an open position and the circuit to the motor 39 is broken. When the temperature of the bimetallic element 49 is below a predetermined low temperature, the contacts are retained in a closed position and the branch circuit to the motor 39 is completed. Thus, the thermostatic switch normally opens and closes the motor circuit as the temperature within the receptacle rises above and falls below predetermined values. This arrangement is particularly satisfactory because heat is available when needed and yet the deodorizer is not rendered ineffective to any substantial degree because the accumulation of odors is a very gradual process and intermittent operation of the deodorizer has been found to be entirely sufficient.

I have provided electrical connections for conducting electric power to the motor circuit. There is provided in the rear wall of the cabinet a suitable terminal block 54 having a pair of terminals suitably connected to an electric circuit, the circuit being represented by the numerals 45 in Figure 6. There is illustrated a connector or terminal block 55 secured in position to the rear wall 15 of the receptacle disposed between the outer wall and the studs 20, as by passing the threaded fastening members 22 through suitable openings in the member 55 as well as the described openings in the rear wall of the outer shell. The plug assembly comprising the suitable terminals 43 and 44 is suitably secured to the member 55 as by rivets, for example, the plate or member 54 being formed from electrically insulating material.

Although I have shown a particular embodiment of my invention, modifications will occur to those skilled in the art. For instance, other sources of incidentally developed heat may be disposed within the refrigerator compartment and may be utilized for conducting heat to the receptacle. Moreover, other electrical devices which develop heat incidentally during operation thereof may be employed for the purposes of my invention. Accordingly, I do not desire my invention to be limited to the particular embodiment of my invention described herein but I intend in the appended claims to cover all modifications within the spirit and scope of my invention.

What I claim as new and desire to secure by Letters Patent of the United States is:

1. In a refrigerator cabinet of the type having a refrigerated storage compartment, an electrical device within said compartment, an electric circuit for said device and a storage receptacle within said compartment for the storage of butter or the like, means for conducting heat incidentally resulting from the operation of said electric device to said receptacle for maintaining the temperture therein above the temperatures prevailing in the storage compartment.

2. In a refrigerator cabinet of the type having a refrigerated storage compartment, an electric device within said compartment, an electric circuit for said device and a storage receptacle within said compartment for the storage of butter or the like, means for conducting heat incidentally resulting from the operation of said electric device to said receptacle for maintaining the temperature therein above the temperatures prevailing in the storage compartment, and thermally responsive means responsive to the temperature of said receptacle for controlling said circuit.

3. In a refrigerator cabinet having a refrigerated compartment and a storage receptacle for butter and the like, an electric device mounted in thermal association with said receptacle so that the heat incidentally resulting from the operation of said device is utilized to maintain said receptacle above the temperature prevailing in said storage compartment, and an electric circuit for said device.

4. In a refrigerator cabinet having a refrigerated compartment and a storage receptacle for butter and the like, an electric device mounted in thermal association with said receptacle so that the heat incidentally resulting from the operation of said device is utilized to maintain said receptacle above the temperature prevailing in said storage compartment, an electric circuit for said device, and thermostatic means responsive to the temperature of said receptacle for controlling said circuit.

CARL F. SCOTT.